US012677826B2

(12) United States Patent
Ohara et al.

(10) Patent No.: US 12,677,826 B2
(45) Date of Patent: Jul. 14, 2026

(54) ORGAN PRESERVATION CONTAINER

(71) Applicant: SCREEN HOLDINGS CO., LTD., Kyoto (JP)

(72) Inventors: Masayuki Ohara, Kyoto (JP); Hiroo Kasamatsu, Kyoto (JP); Syuhei Yoshimoto, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 475 days.

(21) Appl. No.: 18/280,378

(22) PCT Filed: Oct. 7, 2021

(86) PCT No.: PCT/JP2021/037077
§ 371 (c)(1),
(2) Date: Sep. 5, 2023

(87) PCT Pub. No.: WO2022/195936
PCT Pub. Date: Sep. 22, 2022

(65) Prior Publication Data
US 2024/0074432 A1      Mar. 7, 2024

(30) Foreign Application Priority Data
Mar. 19, 2021      (JP) ................................. 2021-045357

(51) Int. Cl.
*A01N 1/143*          (2025.01)
(52) U.S. Cl.
CPC .................................... *A01N 1/143* (2025.01)

(58) Field of Classification Search
None
See application file for complete search history.

(56) References Cited

U.S. PATENT DOCUMENTS

| | | | |
|---|---|---|---|
| 8,535,934 B2 | 9/2013 | Hassanein et al. | |
| 2015/0342177 A1* | 12/2015 | Hassanein | .............. A01N 1/143 |
| | | | 435/284.1 |

(Continued)

FOREIGN PATENT DOCUMENTS

| | | |
|---|---|---|
| CN | 1251586 C | 4/2006 |
| CN | 111903664 A | 11/2020 |
| EP | 1017274 B1 | 11/2003 |

(Continued)

OTHER PUBLICATIONS

Extended European Search Report dated Feb. 17, 2025, issued in corresponding European Patent Application No. 21931679.1, 9 pages.

(Continued)

*Primary Examiner* — Michael L Hobbs
(74) *Attorney, Agent, or Firm* — Rimon P.C.

(57) ABSTRACT

An organ preservation container includes a container body, joints, and tubes. The container body includes a bottom plate and a side wall. The side wall has through holes. Each joint has a through hole. The tubes are connected to the joints from the inner side of the container body. Thus, the tubes are arranged in advance in the container body in an organ transplant operation. This enables a small number of people to speedily conduct the work of placing an organ removed from the donor in the container body and connecting the tubes to blood vessels in the organ.

7 Claims, 6 Drawing Sheets

(56) References Cited

U.S. PATENT DOCUMENTS

2015/0342178 A1* 12/2015 Steen ..................... A01N 1/143
435/284.1
2022/0000096 A1 1/2022 Kobayashi et al.

FOREIGN PATENT DOCUMENTS

| EP | 1117293 B1 | 9/2009 |
| EP | 2 926 657 A1 | 10/2015 |
| JP | 2004-075583 A | 3/2004 |
| JP | 2016-160247 A | 9/2016 |
| JP | 2019-043939 A | 3/2019 |
| JP | 2019-048776 A | 3/2019 |
| JP | 2020-083785 A | 6/2020 |
| WO | WO-2019044354 A1 * 3/2019 | ............... A01N 1/10 |

OTHER PUBLICATIONS

International Search Report issued in corresponding International Patent Application No. PCT/JP2021/037077, dated Nov. 22, 2021, with English translation.
Matsuno, Naoto, "Organ Extraction and Preservation for Transplants, Perfusion Preservation: Kidneys (Sustained Perfusion Preservation)," Maruzen Publishing Co., Ltd., Mar. 5, 2012, pp. 238-239.

* cited by examiner

NORMAL DIRECTION

ORGAN PRESERVATION CONTAINER

CROSS REFERENCE TO RELATED APPLICATIONS

This application is the U.S. National Phase under 35 U.S.C. § 371 of International Patent Application No. PCT/JP2021/037077, filed on Oct. 7, 2021, which claims the benefits of Japanese Patent Application No. 2021-045357, filed on Mar. 19, 2021 the entire contents of which are hereby incorporated by reference.

TECHNICAL FIELD

The present invention relates to an organ preservation container for preserving an organ in vitro.

BACKGROUND ART

In organ transplant operations such as liver transplantation, after an organ is removed from the donor, the organ is temporarily preserved in vitro until transplantation into the recipient. At this time, processing may be performed such as flushing for cleaning blood vessels in the organ or perfusion for perfusing blood vessels in the organ with a liquid such as physiological saline. When flushing or perfusion is performed, tubes are connected to the organ removed from the donor. Then, a solution is supplied through the tubes to the blood vessels in the organ.

For example, Patent Literature (PTL) 1 describes a conventional device for preserving an organ removed from the donor in vitro.

CITATION LIST

Patent Literature

PTL 1: Japanese Patent Application Laid-Open No. 2019-48776

SUMMARY OF INVENTION

Technical Problem

In organ transplant operations, tubes need to be connected very speedily to the organ removed from the donor in order to retard deterioration of the organ. Thus, a plurality of people share work, such as shifting the organ from the body cavity of the donor to a container outside the body, holding and handing over the tubes, expanding blood vessels in the organ, and inserting the tubes into blood vessels. However, there is a limit to the number of people who can conduct the work around the organ, and there is demand for speedily completing work with a small number of people.

The present invention has been made in light of such circumstances, and it is an object of the present invention to provide an organ preservation container that enables a small number of people to speedily conduct the work of connecting tubes to an organ removed from the donor.

Solution to Problem

To solve the problem described above, a first aspect of the present application is an organ preservation container for preserving an organ in vitro. The organ preservation container includes a container body including a bottom plate and a side wall, the side wall extending upward from an outer peripheral edge of the bottom plate, a through hole penetrating the side wall, a joint provided in the through hole, and a tube having one end connected to the joint from an inner side of the container body and the other end insertable into a blood vessel in an organ.

A second aspect of the present application is the organ preservation container according to the first aspect, in which the tube extends in a direction of a normal to the side wall.

A third aspect of the present application is the organ preservation container according to the first or second aspect, in which the joint is located at a height of 30 mm or more and 100 mm or less from an upper surface of the bottom plate.

A fourth aspect of the present application is the organ preservation container according to any one of the first to third aspects that further includes a plurality of sets of the through hole, the joint, and the tube.

A fifth aspect of the present application is the organ preservation container according to the fourth aspect, in which the joints in the plurality of sets are arranged in an up-down direction.

A sixth aspect of the present application is the organ preservation container according to the fourth or fifth aspect, in which the tubes in the plurality of sets include a short tube having a length shorter than an inside diameter of the side wall, and a long tube having a length longer than or equal to the inside diameter of the side wall.

A seventh aspect of the present application is the organ preservation container according to any one of the fourth to sixth aspects that further includes plugs that seal some of the through holes in the plurality of sets.

An eighth aspect of the present application is the organ preservation container according to any one of the first to seventh aspects, in which the joint includes a connector that is inserted between the through hole and the tube, and the connector has a joint hole suitable for a diameter of the tube.

Advantageous Effects of Invention

According to the first to eighth aspects of the present application, the tube can be arranged in advance inside the container body. This enables a small number of people to speedily conduct the work of placing the organ removed from the donor in the container body and connecting the tube to a blood vessel in the organ during an organ transplant operation.

In particular, according to the fourth aspect of the present application, it is possible to secure a passage for supplying a liquid to the organ and a passage for discharging the liquid from the organ. Besides, some of the through holes can be used depending on the size and shape of the organ.

In particular, according to the fifth aspect of the present application, the tubes can be arranged in parallel with one another.

In particular, according to the sixth aspect of the present application, after the short tube is connected to one of blood vessels in the organ, the long tube can be cut in accordance with the position of another blood vessel in the organ and connected to the other blood vessel.

In particular, according to the seventh aspect of the present application, non-used through holes can be sealed with the plug.

In particular, according to the eighth aspect of the present application, a plurality of connectors having joint holes of different diameters are prepared, and connectors that have a joint hole suitable for the diameter of the tube to be used are attached to the through holes. Accordingly, the organ preservation container is adaptive to a plurality of types of tubes of different diameters.

DESCRIPTION OF EMBODIMENT

Hereinafter, an embodiment of the present invention will be described with reference to the drawings.

In the present application, the "donor" and the "recipient" may be humans, or may be non-human animals. That is, the "organs" according to the present application may be human organs, or may be organs of non-human animals. The non-human animals may be rodents such as mice and rats, ungulates such as pigs, goats, and sheep, non-human primates such as chimpanzees, or other non-human mammals, or may be non-mammalian animals.

1. Configuration of Organ Preservation Container

Figure 1:
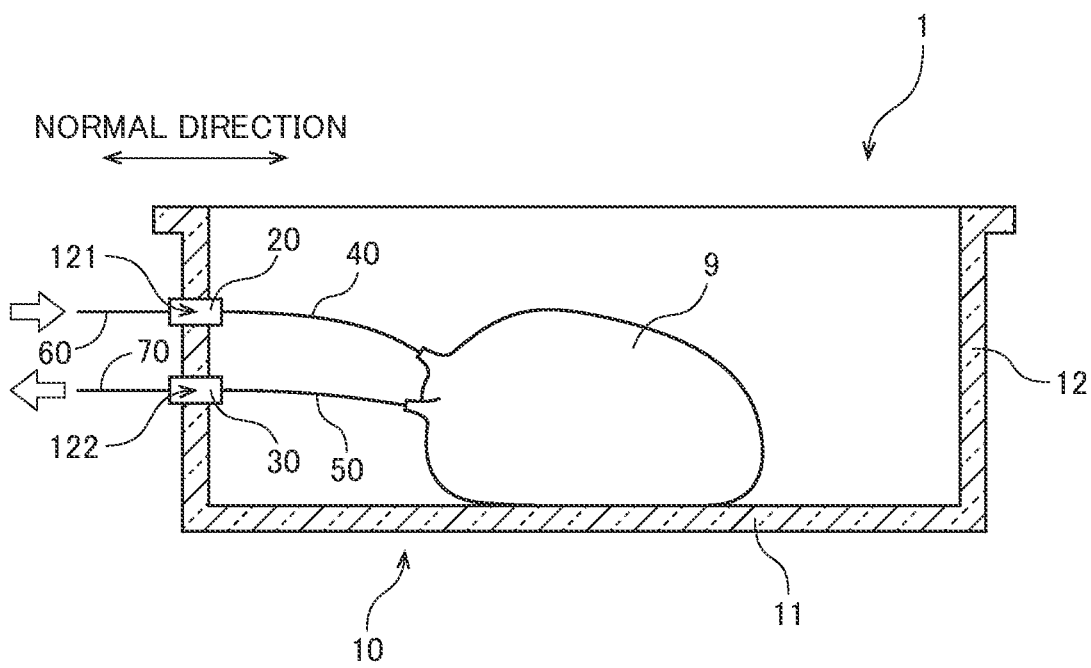
FIG. 1 is a longitudinal sectional view of an organ preservation container.

FIG. 1 is a longitudinal sectional view of an organ preservation container 1 according to one embodiment. The organ preservation container 1 is a container for temporarily preserving an organ 9 removed from the donor in vitro until translation into the recipient in a transplant operation of the organ 9. The organ 9 preserved in the organ preservation container 1 may, for example, be a liver, a kidney, a heart, or a pancreas. It is, however, noted that the organ 9 preserved in the organ preservation container 1 may be any organ other than those described above, or may be a part of an organ.

As shown in FIG. 1, the organ preservation container 1 according to the present embodiment includes a container body 10, a first joint 20, a second joint 30, a first tube 40, and a second tube 50.

The container body 10 is a so-called reactor capable of placing the organ 9 therein. The container body 10 has a closed-end cylindrical shape. The container body 10 includes a flat plate-like bottom plate 11 and a cylindrical side wall 12. The bottom plate 11 expands in a horizontal plane. The side wall 12 extends upward from the outer peripheral edge of the bottom plate 11. When viewed from above, the bottom plate 11 may, for example, have a circular shape. In this case, the side wall 12 has a circular cylindrical shape. It is, however, noted that the bottom plate 11 and the side wall 12 may have any other shape such as a rectangular shape when viewed from above.

The side wall 12 has a first through hole 121 and a second through hole 122. The first and second through holes 121 and 122 are arranged in the up-down direction. In the following description, the direction of the normal to the side wall 12 at the positions of the first and second through holes 121 and 122 is simply referred to as the "normal direction." The first and second through holes 121 and 122 each penetrate the side wall 12 in the normal direction. With no tubes connected thereto, the first and second through holes 121 and 122 serve as holes that communicate the space inside the side wall 12 to the space outside the side wall 12.

The first through hole 121 is provided with the first joint 20. The second through hole 122 is provided with the second joint 30. The first tube 40 is connectable to the first joint 20 from the inner side of the container body 10. The second tube 50 is connectable to the second joint 30 from the inner side of the container body 10.

Figure 2:
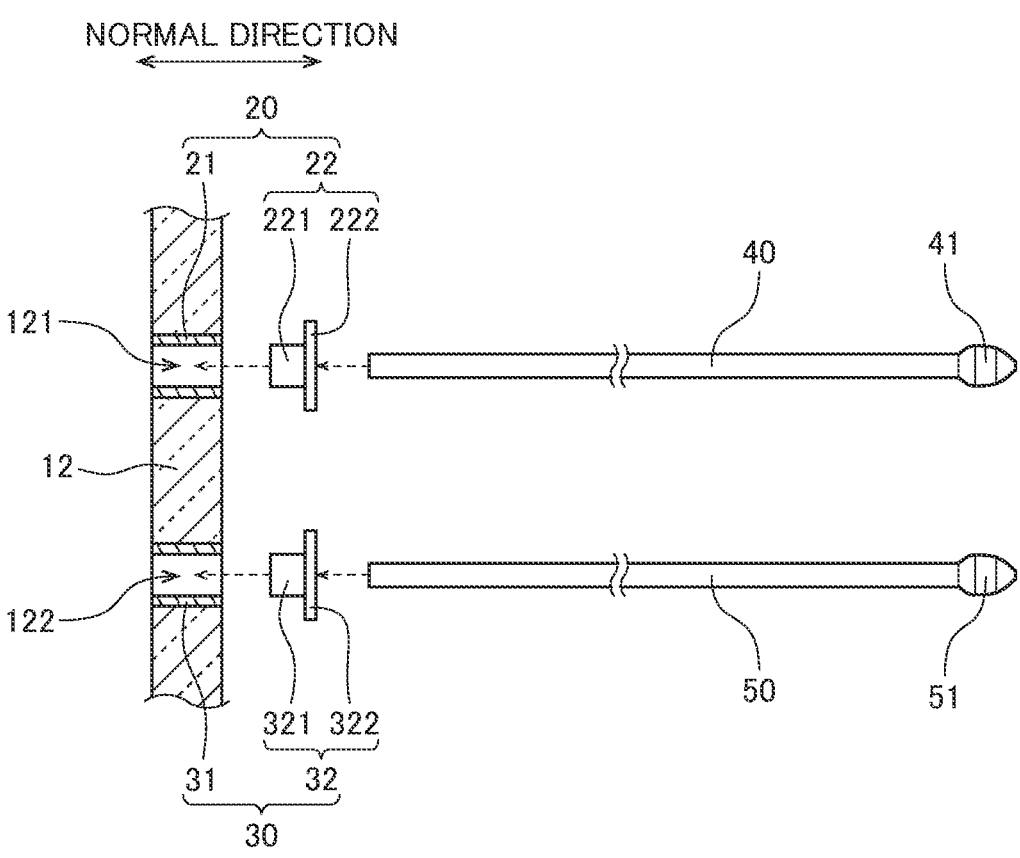
FIG. 2 is an exploded view of first and second joints and first and second tubes.

FIG. 2 is an exploded view of the first and second joints 20 and 30 and the first and second tubes 40 and 50. As shown in FIG. 2, the first joint 20 according to the present embodiment includes a first ring member 21 and a first connector 22. The first ring member 21 is a cylindrical member. The first ring member 21 is fixed to the inner peripheral surface of a hole penetrating the side wall 12. In the present embodiment, the space inside the first ring member 21 is referred to as the first through hole 121. That is, the first ring member 21 is fixed to the edge portion of the first through hole 121.

Figure 3:
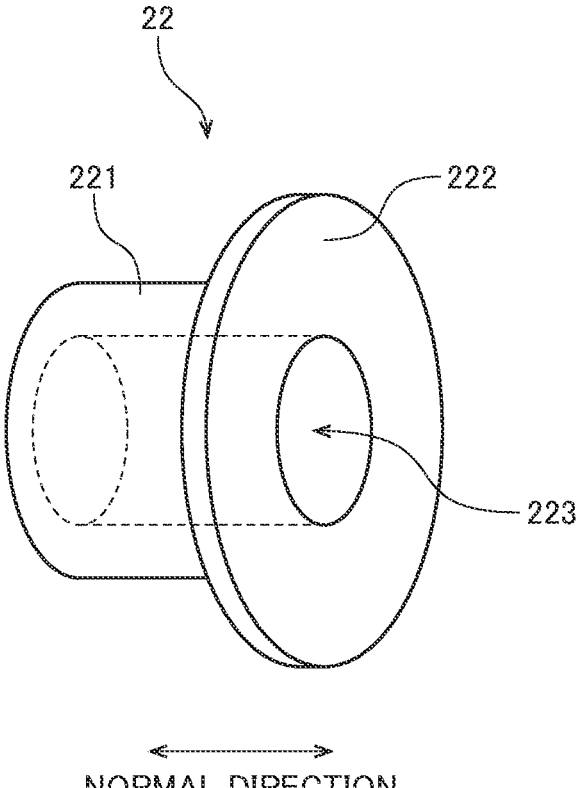
FIG. 3 is a perspective view of a first connector.

The first connector 22 is inserted between the first ring member 21 and the first tube 40. FIG. 3 is a perspective view of the first connector 22. As shown in FIGS. 2 and 3, the first connector 22 includes a cylindrical first protrusion 221 and a first flange 222 that expands outward from the outer peripheral surface of the first protrusion 221. As indicated by a broken arrow in FIG. 2, the first protrusion 221 is press-fitted into the first through hole 121 inside the first ring member 21 from the inner side of the container body 10. The first flange 222 comes in contact with the inner peripheral surface of the side wall 12. In this way, the first connector 22 is positioned relative to the side wall 12. The material for the first connector 22 may, for example, be silicone rubber having elasticity. The first connector 22 and the first ring member 21 come in tight contact with each other. In this way, the first connector 22 and the first ring member 21 are integrated with each other. This configuration reduces leakage of a liquid from interstices between the first connector 22 and the first ring member 21. The first ring member 21 is formed of a material having higher adhesion to the first connector 22 than the container body 10. Thus, attaching the first connector 22 via the first ring member 21 to the container body 10 reduces more liquid leakage than attaching the first connector 22 directly to the container body 10.

The second joint 30 has a configuration comparable to that of the first joint 20 described above. That is, the second joint 30 includes a second ring member 31 and a second connector 32. The second ring member 31 is fixed to the inner peripheral surface of a hole penetrating the side wall 12. In the present embodiment, the space inside the second ring member 31 is referred to as the second through hole 122. That is, the second ring member 31 is fixed to the edge portion of the second through hole 122. The second connector 32 is inserted between the second ring member 31 and the second tube 50. Like the first connector 22, the second connector 32 includes a second protrusion 321 and a second flange 322.

As shown in FIG. 3, the first connector 22 has a first joint hole 223 on the inside of the first protrusion 221 and the first flange 222. The first joint hole 223 penetrates the first connector 22 in a direction of the normal to the side wall 12. The second connector 32 also has a similar second joint hole (not shown). The first joint hole 223 has dimensions (inside diameter) suitable for the outside diameter of the first tube 40. Specifically, the first joint hole 223 has approximately the same dimensions (inside diameter) as the outside diameter of the first tube 40. The second joint hole has dimensions (inside diameter) suitable for the outside diameter of the second tube 50. Specifically, the second joint hole has approximately the same dimensions (inside diameter) as the outside diameter of the second tube 50.

The first tube 40 is a duct for supplying a liquid such as physiological saline to the organ 9 placed in the container body 10. The second tube 50 is a duct for discharging the liquid from the organ 9. The first and second tubes 40 and 50 have flexibility.

One end of the first tube 40 is press-fitted in the first joint hole 223 of the first connector 22 from the inner side of the container body 10. Thus, the first tube 40 is connected to the first connector 22. The first tube 40 extends from the first joint 20 toward the inside of the container body 10 and in the direction of the normal to the side wall 12. The other end of the first tube 40 is provided with a first inserter 41. The first inserter 41 has such a shape that its outside diameter once increases and then gradually converges in a direction toward the tip end. The first inserter 41 is inserted in an artery of the organ 9. For example, when the organ 9 is the liver, the first inserter 41 is inserted in the portal vein or hepatic artery of the liver. The first inserter 41 may be inserted into a blood vessel for blood flow other than an artery, such as the portal vein.

One end of the second tube 50 is press-fitted in the second joint hole of the second connector 32 from the inner side of the container body 10. Thus, the second tube 50 is connected to the second connector 32. The second tube 50 extends from the second joint 30 toward the inside of the container body 10 and in the direction of the normal to the side wall 12. The other end of the second tube 50 is provided with a second inserter 51. The second inserter 51 has such a shape that its outside diameter once increases and then gradually converges in a direction toward the tip end. The second inserter 51 is inserted in a vein of the organ 9. For example, when the organ 9 is the liver, the second inserter 51 is inserted in the suprahepatic inferior vena cava (SH-IVC) or infrahepatic inferior vena cava (IH-IVC) of the liver.

Outside the container body 10, the first joint 20 is connected to the downstream end of a supplying tube 60 for supplying a liquid as shown in FIG. 1. The upstream end of the supplying tube 60 is connected to a reservoir (not shown) serving as a supplying source. The reservoir stores a liquid to be supplied to the organ 9. The reservoir may be a drip bag (pouch bag), or may be a tank for storing a liquid. Examples of the liquid supplied from the reservoir include physiological saline, an ETK solution, an HTK solution, and an UW solution.

The liquid is supplied from the reservoir to an artery of the organ 9 through the supplying tube 60, the first joint 20, and the first tube 40. In this way, the liquid flows through a blood vessel in the organ 9 and removes blood clots or waste products in the organ 9. By passing the liquid through a blood vessel in the organ 9, it is possible to preserve the organ 9 while retarding deterioration of the organ 9. Alternatively, a pump may be provided on the pathway of the supplying tube 60 to accelerate the flow of the liquid through the pump.

Outside the container body 10, the second joint 30 is connected to the upstream end of a drainage tube 70 for discharging a liquid as shown in FIG. 1. The downstream end of the drainage tube 70 is connected to a drain tank or a drain line. The liquid flowing out of a vein of the organ 9 is discharged to the drain tank or the drain line through the second tube 50, the second joint 30, and the drainage tube 70. Alternatively, the downstream end of the drainage tube

70 may be connected to a reservoir to return the liquid flowing out of the organ 9 to the reservoir.

2. Procedure of Organ Transplantation

Figure 4:
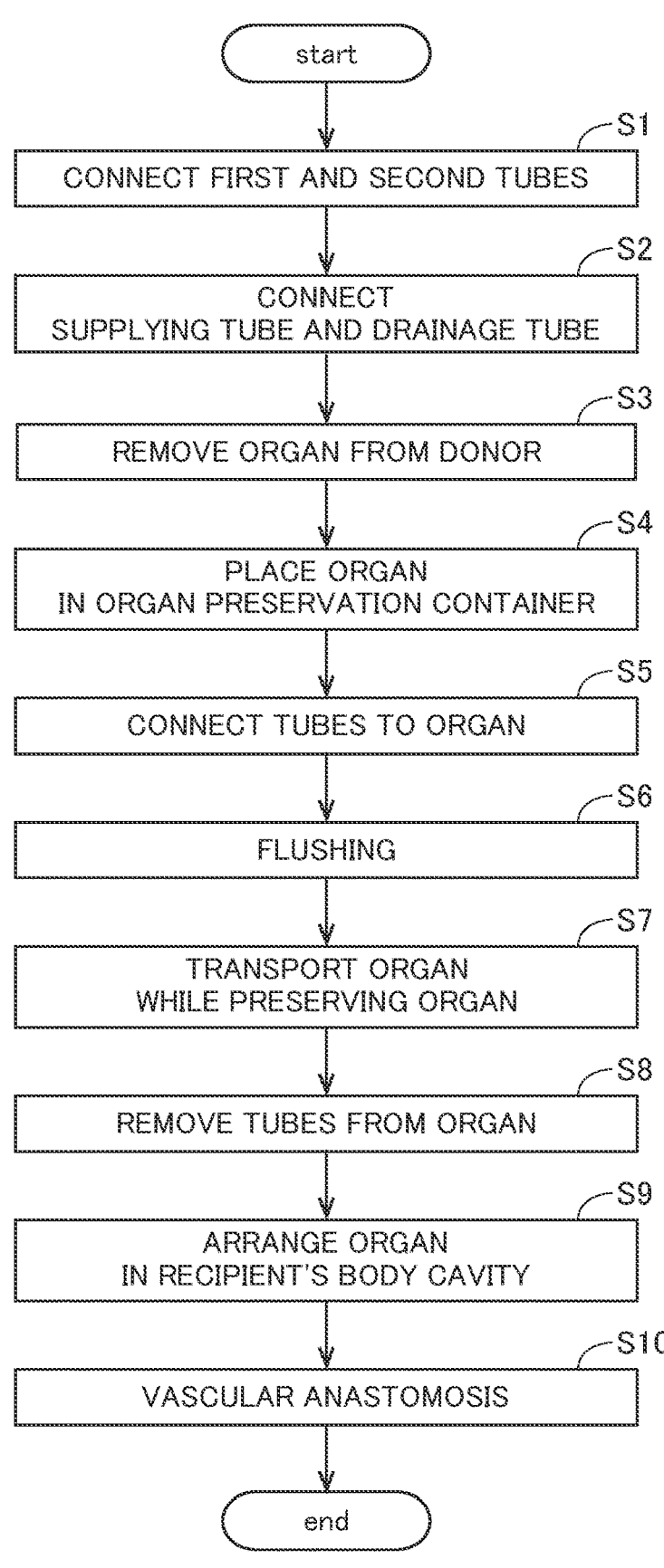
FIG. 4 is a flowchart showing the procedure of an organ transplant operation.

Next is a description of the procedure of an organ transplant operation using the organ preservation container 1 described above. FIG. 4 is a flowchart showing the procedure of an organ transplant operation. In the following description, people who conduct work for an organ transplant operation are referred to as "operators." Examples of the operators include doctors as surgery operators and nurses who assist the doctors.

For an organ transplant operation, the organ preservation container 1 is prepared in advance. An operator connects the first tube 40 to the first joint 20 of the organ preservation container 1 and connects the second tube 50 to the second joint 30 (step S1). Specifically, the operator connects the first connector 22 to the first through hole 121 from the inner side of the container body 10. Then, the operator connects the first tube 40 to the first connector 22. The operator also connects the second connector 32 to the second through hole 122 from the inner side of the container body 10. Then, the operator connects the second tube 50 to the second connector 32. In this way, the first and second tube 40 and 50 are arranged in the container body 10.

The operator also connects the supplying tube 60 to the first joint 20 and connects the drainage tube 70 to the second joint 30 from the outside of the container body 10 (step S2). The supplying tube 60 is connected to the first tube 40 through the first through hole 121, thereby forming a flow path. The second tube 50 is connected to the drainage tube 70 through the second through hole 122, thereby forming a flow path. Note that the sequence of steps S1 and S2 may be reversed.

When the preparation of the organ preservation container 1 has completed, the operator removes the organ 9 from the donor (step S3). Specifically, the operator dissects the abdominal part of the donor and cuts an artery and a vein of the organ 9 in the body cavity of the donor. Then, the operator holds and takes out the organ 9 from the inside of the body cavity of the donor with both hands and places the organ 9 in the container body 10 of the organ preservation container 1 (step S4). Thereafter, the operator inserts the first inserter 41 of the first tube 40 in the artery of the organ 9 and inserts the second inserter 51 of the second tube 50 in the vein of the organ 9. In this way, the first tube 40 is connected to the artery of the organ 9, and the second tube 50 is connected to the vein of the organ 9 (step S5).

During the work in step S5, there is no need for the operator to receive the first and second tubes 40 and 50 from other operators because the first and second tubes 40 and 50 are arranged inside the container body 10. This hastens the connection of the first and second tubes 40 and 50 to the organ 9. This also eliminates the need for other operators to wait while holding the tubes and accordingly makes it possible to reduce the number of operators.

When the first and second tubes 40 and 50 been connected to the organ 9, the operator performs flushing for cleaning blood vessels in the organ 9 (step S6). Specifically, the operator opens a clamp provided on the pathway of the supplying tube 60. This allows a liquid to be supplied from the reservoir to the blood vessels in the organ 9 through the supplying tube 60, the first joint 20, and the first tube 40. Then, the liquid is discharged from the blood vessels in the organ 9 to the drainage tube 70 through the second tube 50 and the second joint 30. In this way, blood clots or waste products are washed away from the blood vessels in the organ 9.

Thereafter, the operator preserves the organ 9 by a simple cooling preservation method or a perfusion preservation method. In the case of using the simple cooling preservation method, a liquid having a low temperature (e.g., 4° C.) such as physiological saline is stored in the container body 10, and the organ 9 is immersed in this liquid. On the other hand, in the case of using the perfusion preservation method, the liquid continues to be supplied to the organ 9. That is, the liquid is supplied from the reservoir to a blood vessel in the organ 9 through the supplying tube 60, the first joint 20, and the first tube 40. Then, the liquid is discharged from the blood vessel in the organ 9 to the drainage tube 70 through the second tube 50 and the second joint 30.

The operator transports the organ preservation container 1 with the organ 9 placed therein, to the recipient while preserving the organ 9 by either method described above (step S7).

When the organ 9 has arrived at the recipient, an operator removes the first inserter 41 of the first tube 40 from the artery of the organ 9 and removes the second inserter 51 of the second tube 50 from the vein of the organ 9 (step S8). Then, the operator takes out the organ 9 from the organ preservation container 1 and arranges the organ 9 in the body cavity of the recipient (step S9). Then, the operator anastomoses the artery of the organ 9 to an artery of the recipient and anastomoses the vein of the organ 9 to a vein of the recipient (step S10). Thereafter, the operator closes the abdomen of the recipient.

As described above, the use of the organ preservation container 1 makes it possible to arrange the first and second tubes 40 and 50, which are connected to the organ 9, in advance inside the container body 10. This hastens the work of placing the organ 9 removed from the donor in the organ preservation container 1 and connecting the first and second tubes 40 and 50 to blood vessels in the organ 9 in the organ transplant operation. Accordingly, it is possible to preserve the organ 9 while retarding deterioration of the organ 9.

In the organ preservation container 1, one ends of the first and second tubes 40 and 50 are fixed to the container body 10. This allows the first and second tubes 40 and 50 to position the organ 9 placed in the container body 10. Accordingly, the organ 9 is maintained at a constant position and in a constant posture relative to the container body 10. Since the movement of the organ 9 in the container body 10 is prevented during transport of the organ 9, it is possible to reduce damage to the organ 9.

The first and second joints 20 and 30 may preferably be arranged at heights suitable for the heights of blood vessels in the preserved organ 9. In consideration of the general size of the organ 9, it is preferable that the first and second joints 20 and 30 are located at heights of 30 mm or more and 100 mm or less from the upper surface of the bottom plate 11.

The organ preservation container 1 according to the present embodiment includes two sets of through holes, joints, and tubes. Thus, it is possible to secure a passage for supplying a liquid to the artery of the organ 9 and a passage for discharging a liquid from the vein of the organ 9. Accordingly, the organ 9 can be preserved by the perfusion preservation method. Alternatively, the organ preservation container 1 may include only one set or three or more sets of through holes, joints, and tubes. For example, when the organ 9 is the liver including two arteries, i.e., the portal vein and the hepatic artery, two tubes may be provided as artery tubes, specifically one for the portal vein and one for the hepatic artery.

In the case where the organ preservation container includes a plurality of joints, these joints may preferably be arranged in the up-down direction. In this case, a plurality of tubes connected to the joints are arranged in parallel with one another. Accordingly, the tubes can be connected in the same orientation relative to the organ 9. This reduces the risk of occurrence of bends (kinking) in the tubes. In particular, when the organ 9 is the liver, it is preferable that the tube to be connected to the portal vein and the tube to be connected to the hepatic artery are arranged in parallel because the portal vein and the hepatic artery are arranged in parallel.

The organ preservation container 1 according to the present embodiment includes the first connector 22 inserted between the first through hole 121 and the first tube 40. Then, the first tube 40 is connected to the first joint hole 223 of the first connector 22, instead of being directly connected to the first through hole 121. Thus, if a plurality of first connectors 22 that include first joint holes 223 of different diameters are prepared in advance, it is possible to select a first connector 22 that includes the first joint hole 223 suitable for the diameter of the first tube 40 for use, and to attach the selected first connector 22 to the first through hole 121. Accordingly, the organ preservation container becomes adaptive to a plurality of types of first tubes 40 of different dimensions.

The same applies to the second connector 32. That is, if a plurality of second connectors 32 that include second joint holes of different diameters are prepared in advance, the organ preservation container becomes adaptive to a plurality of types of second tubes 50 of different dimensions.

3. Variations

Although one embodiment of the present invention has been described above, the present invention is not intended to be limited to the above-described embodiment.

3-1. First Variation

Figure 5:
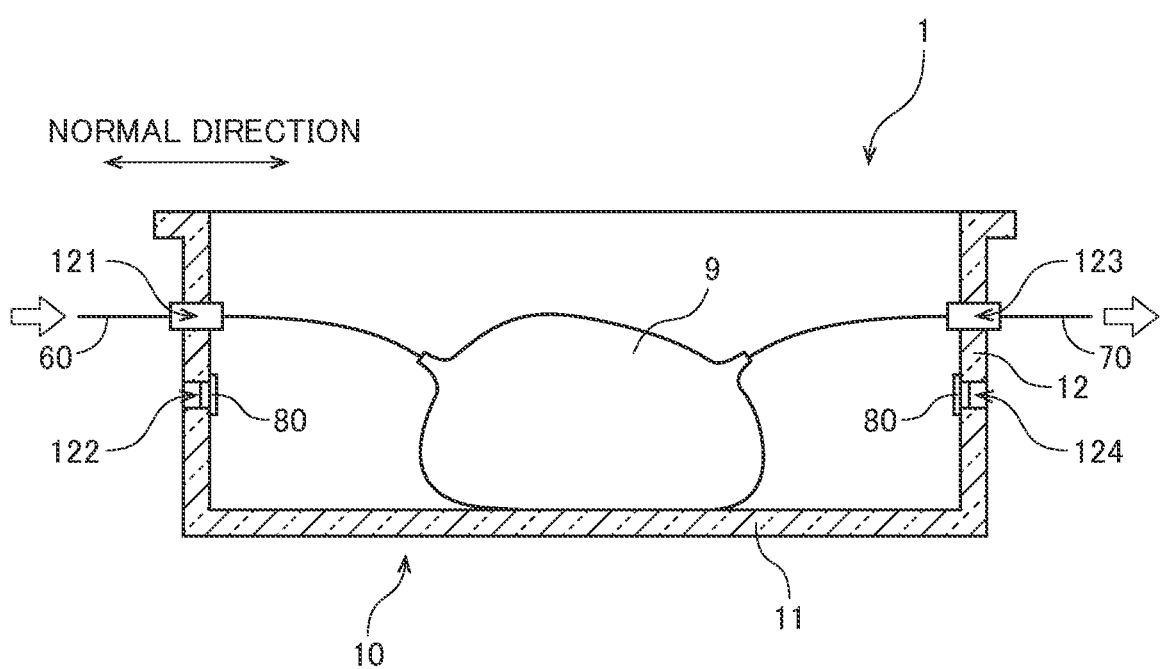
FIG. 5 is a sectional view of an organ preservation container according to a first variation.

FIG. 5 is a sectional view of the organ preservation container 1 according to a first variation. In the example shown in FIG. 5, the side wall 12 of the container body 10 has four through holes 121, 122, 123, and 124. Then, joints and tubes are connected to only two through holes 121 and 123 among the four through holes 121, 122, 123, and 124. In this way, the container body 10 may be provided with a plurality of through holes, and only through holes located at appropriate positions may be used depending on the size or shape of the organ 9.

The organ preservation container 1 in FIG. 5 further includes two plugs 80 for sealing the two through holes 122 and 124 that are not used. In this case, when the organ 9 is preserved by the simple cooling method, it is possible to prevent the liquid stored in the container body 10 from leaking out from the non-used through holes 122 and 124 to the outside.

3-2. Second Variation

Figure 6:
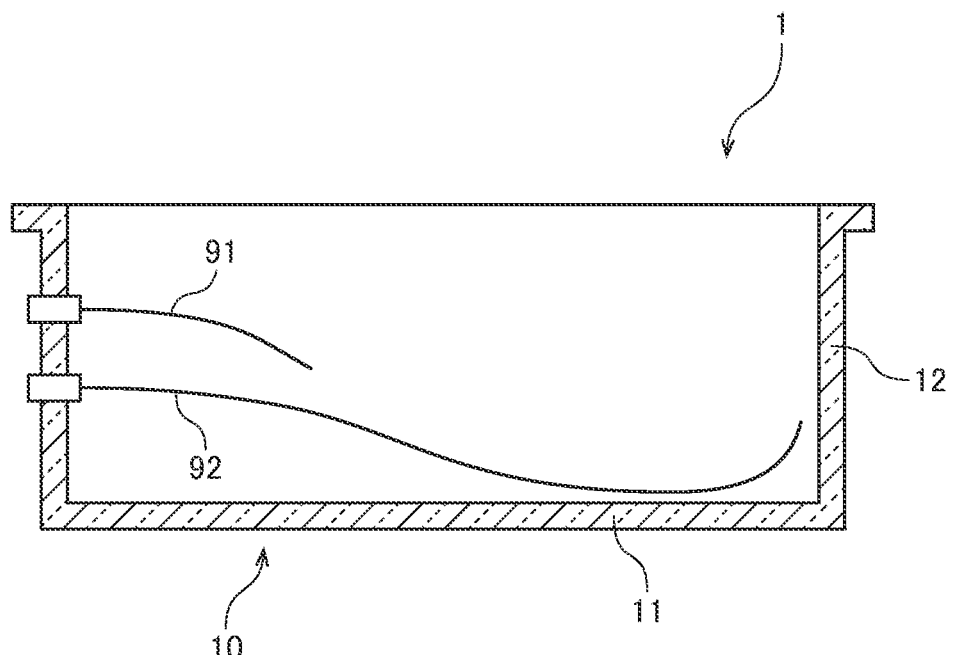
FIG. 6 is a sectional view of an organ preservation container according to a second variation.

FIG. 6 is sectional view of the organ preservation container 1 according to a second variation. The organ preservation container 1 in FIG. 6 includes a short tube 91 and a long tube 92. The short tube 91 is a tube that is connected to one of a plurality of blood vessels in the organ 9 (hereinafter, the one blood vessel is referred to as a "first blood vessel"). The long tube 92 is a tube that is connected to another blood vessel (hereinafter, this blood vessel is referred to as a "second blood vessel") in the organ 9. The first and second blood vessels each may be either an artery or a vein. As shown in FIG. 6, the short tube 91 has a length shorter than the inside diameter of the side wall 12 of the container body 10 (the diameter of the internal peripheral surface). The long tube 92 has a length greater than or equal to the inside diameter of the side wall 12 of the container body 10 (the diameter of the inner peripheral surface).

In the case of using the organ preservation container 1, an operator places the organ 9 in the container body 10 and then connects the short tube 91 to the first blood vessel in the organ 9. Then, the operator determines the position of the organ 9 such that no bends occur in the short tube 91. Then, the operator cuts the long tube 92 in accordance with the position of the second blood vessel in the organ 9. In this way, the length of the long tube 92 is made to a length suitable for the distance from the joint to the second blood vessel. Thereafter, the long tube 92 is connected to the second blood vessel in the organ 9. This allows the long tube 92 to be arranged with no bends.

Alternatively, the organ preservation container 1 may include one short tube 91 and a plurality of long tubes 92.

3-3. Other Variations

In the embodiment described above, the tip end of each tube is directly connected to an artery or vein of the organ 9. Alternatively, a catheter may be used to connect each tube to an artery or vein of the organ 9.

The organ preservation container 1 according to the embodiment described above includes a tube for supplying a liquid to the organ 9, and a tube for discharging a liquid from the organ 9. Alternatively, the organ preservation container 1 may include only either one of the tube for supplying a liquid to the organ 9 and the tube for discharging a liquid from the organ 9. In this case, the other one of the tubes, i.e., either the one for supplying a liquid to the organ 9 or the one for discharging liquid from the organ 9, may be connected to the outside of the organ preservation container 1 without being fixed to the organ preservation container 1. In the case where the organ preservation container 1 includes only the tube for supplying a liquid to the organ 9, the liquid discharged from the organ 9 may bleed inside the container body 10.

The configurations of the above-described preferred embodiment and variations may be appropriately combined as long as there are no mutual inconsistencies.

REFERENCE SIGNS LIST

1 organ preservation container
9 organ
10 container body
11 bottom plate
12 side wall
20 first joint
21 first ring member
22 first connector
30 second joint
31 second ring member
32 second connector
40 first tube
41 first inserter
50 second tube
51 second inserter
60 supplying tube
70 drainage tube
80 plug
91 short tube
92 long tube
121 first through hole
122 second through hole
123 through hole
124 through hole
221 first protrusion
222 first flange
223 first joint hole
321 second protrusion
322 second flange

The invention claimed is:

1. An organ preservation container for preserving an organ in vitro, the organ preservation container comprising:
    a container body including a bottom plate and a side wall, the side wall extending upward from an outer peripheral edge of the bottom plate;
    a through hole penetrating the side wall;
    a joint provided in the through hole; and
    a tube having one end connected to the joint from an inner side of the container body and the other end insertable into a blood vessel in an organ,
    wherein the joint is located at a height of 30 mm or more and 100 mm or less from an upper surface of the bottom plate.

2. The organ preservation container according to claim 1, wherein
    the tube extends in a direction of a normal to the side wall.

3. The organ preservation container according to claim 1, comprising:
    a plurality of sets of the through hole, the joint, and the tube.

4. The organ preservation container according to claim 3, wherein the joints in the plurality of sets are arranged in an up-down direction.

5. The organ preservation container according to claim 3, wherein the tubes in the plurality of sets include:
    a short tube having a length shorter than an inside diameter of the side wall; and
    a long tube having a length longer than or equal to the inside diameter of the side wall.

6. The organ preservation container according to claim 3, further comprising:
    plugs that seal some of the through holes in the plurality of sets.

7. The organ preservation container according to claim 1, wherein
    the joint includes a connector that is inserted between the through hole and the tube, and
    the connector has a joint hole suitable for a diameter of the tube.

\* \* \* \* \*